United States Patent Office 3,759,774
Patented Sept. 18, 1973

3,759,774
PROCESS OF MAKING STRUCTURAL PARTS OF IMPROVED SURFACE PROPERTIES
Erich Bader, Hanau am Main, and Hubert Koert, Grossauheim, Germany, assignors to Deutsche Gold- und Silber-Scheideanstalt vormals Roessler, Frankfurt am Main, Germany
No Drawing. Continuation-in-part of application Ser. No. 844,670, July 24, 1969, now Patent No. 3,639,191. This application Aug. 9, 1971, Ser. No. 170,271
Claims priority, application Germany, July 25, 1968, P 17 03 887.8; Feb. 22, 1969, P 19 09 035.8
Int. Cl. B32b 31/12
U.S. Cl. 156—284
23 Claims

ABSTRACT OF THE DISCLOSURE

A structural part is formed of improved surface properties by moistening the part with a liquid polymerizable organic compound and then applying a finely divided thermoplastic polymeric substance in a substantially uniform manner to the faces or one face of the part, the said polymer being at least swellable in said liquid polymerizable composition, and finally subjecting the part to pressure and elevated temperatures sufficient to cause curing of the polymerizable organic composition and forming of a substantially coherent polymer coating on the part.

CROSS-REFERENCES TO RELATED APPLICATIONS

This application is a continuation-in-part of application Ser. No. 844,670 filed by the same inventors for "Process of Making Laminated Sheet Products," filing date July 24, 1969, now Pat. 3,639,191.

BACKGROUND OF THE INVENTION

In the above parent case a process is described for improving sheet products consisting of absorptive materials or at least including one sheet of such material. These materials are particularly listed as including wood, cardboard, pressed board, porous stone, asbestos board, fiber board, etc. As stated in the parent case, the impregnation, particularly of wood, with polymerizable organic liquids has long been known. There were thus formed the so-called wood-plastic combinations, which were also called "polymer woods." However, difficulties were encountered with these processes, particularly in connection with the step of hardening the liquid monomeric impregnating composition.

These difficulties, according to the parent case, were overcome by moistening the absorptive sheet or sheets with a liquid polymerizable organic compound and then applying a finely divided thermoplastic polymeric substance in a substantially uniform manner across the sheet, the polymeric substance being soluble or swellable in the liquid polymerizable composition. These steps were followed by applying pressure and elevated temperatures to the sheets to cause curing of the liquid polymerizable organic composition.

A long-felt want in the art of structural parts has been to improve such structural parts, as for instance concrete blocks, by providing them with an improved surface. As already indicated in the parent case, the process there disclosed and claimed was considered useful also for porous stone. The process has now been found to be particularly useful for improving the surface qualities of structural parts such as cellular concrete.

SUMMARY OF THE INVENTION

A surface-improved structural part is formed by a process comprising the steps of:

(a) moistening the structural part with a liquid polymerizable organic compound;
(b) then applying a finely divided thermoplastic polymeric substance in a substantially uniform manner across substantially all of at least one major face of the structural part, the said polymer being soluble or swellable in said liquid polymerizable composition; and finally
(c) subjecting the part to pressure and elevated temperatures sufficient to cause curing of said liquid polymerizable organic composition and to cause formation of a substantially coherent polymer coating on said part.

DESCRIPTION OF THE PREFERRED EMBODIMENTS

As already indicated, a particularly suitable material for improvement by the process of the invention is cellular concrete. Also, generally light weight concrete and similar foamed materials can be processed according to the present invention. Other useful materials are pumice stone, various brick materials such as brick clay, sand-lime clay, and the like. The improved surface obtained by the process of the invention is in particular characterized by a firm attachment to the substrate. Even after considerable length of time of storing in water, the attachment is not impaired. The surface itself is water-proof and has a high degree of weather resistance.

The thus-improved structural parts, particularly the cellular concrete, can be used both in the interior as well as for the exterior surface of buildings. The firmness of the adhesion of the surface is easily demonstrated when trying to split the surface from the main body of the part at the interface. In that case, rupture of the main block always occurs.

The cellular concrete thus improved forms a nail-proof surface. This means that when a partly driven-in nail is bent, no damage occurs to the place of initial penetration. With an ordinary concrete block which has not been improved the nail can easily be removed after being driven into the material and, when bent, the block will always burst at the place of penetration.

The structural part is treated with the polymerizable organic liquir either for a short time or extending over a rather long period of time, depending only on the question of whether a surface coating or rather a deep impregnation is desired.

An optimum impregnation can be obtained by carrying out the treatment in a vacuum and causing the part to dip into the liquid and to be subjected alternatingly to pressures below normal and normal pressures until a weight equilibrium is obtained.

The application with the polymers can follow immediately the treatment with the liquid monomer which in turn may consist in a mere moistening or a complete soaking. Preferably, a slight draining of excess liquid is effected before the polymeric substance is applied. The polymer can then be applied simply by pouring it by hand or mechanical appliances may be used such as pour or spray apparatus. It is also possible to apply the polymer particles in a fluidizing bed or by dipping.

The fine-sized polymers stick to the wet surface and form thereon a practically coherent coating which process can be further improved by swelling or dissolving the polymers. The filled structure may then be stored for a period of time whereupon the pressure and elevated temperatures are applied in conventional apparatus such as a press which is equipped with heating means.

The polymerizable organic composition is thus cured and at the same time there takes place a transformation of the polymer particles into a smooth coating. The finished part thus is not only impregnated or filled with the plastic but has an improved outer surface coating.

The process of the invention is of particular usefulness for applying a decorative outer layer. Such layer in the first place has optical purposes. This means that it need not build up or reinforce the overall product. The use of the polymerizable mixture and application of the polymeric substance in these cases have the main purpose of imparting a better appearance to the outer surface of the body.

Such decorative layers which may be applied are for instance veneers, decorative non-woven materials, decorative papers, etc. In all these cases, the materials are of a comparatively small thickness.

The decorative layer can for instance be applied to the sheet after draining an excess of the polymerizable composition. However, the sheet should still be wet. The decorative coating preferably is adapted to the degree of adsorptiveness of the sheet, that is, it should contain sufficient resin to assure a uniform impregnation. It is of course also possible to use a decorative coating which in turn has been moistened or impregnated with the polymerizable composition in the same manner as above proposed.

It is preferred in many cases to apply the fine particle polymeric substance to both sides of the moistened or impregnated decorative coating prior to assembling it with the other part.

It is also possible to use special dyes on the improved material or use dyed decoratice foils.

Preferably, for instance a cellular concrete block is first treated according to the invention by impregnating it with the polymerizable compostion and then pouring on the treated surface the solid polymerizate. Then, a thin decorative foil, for instance a decorative paper, is similarly treated by impregnating it with the polymerizable liquid and then applying to the wet decorative paper the polymerizate by pouring it onto the paper. The decorative paper is then put on the concrete block and the composite structure is placed betwen the platens of a heated press. At first only a light contact pressure is applied at a comparatively high temperature, whereupon later the full pressure is applied for a short time period. This is followed by cooling and pressure release.

The liquid polymerizable organic composition may be the type of material or combination of materials such as have become known for wood-plastic combinations. Preferred are compositions which include one or several carbon-to-carbon double bonds. Thus, preferred compositions are vinyl compositions and their substitution products, such as esters of acrylic and methacrylic acid, acrylonitrile, styrene and derivatives thereof.

There can also be included cross-linking agents such as divinylbenzene, triallylcyanurate, allylmethacrylate, methacrylic acid esters of glycols and poly-alcohols, etc. Unsaturated polyesters, particularly in mixtures with monomers that may form graft polymers, can also be used. The liquid of first preference is methacrylic acid methyl ester.

The liquid polymerizable organic composition preferably contains also dissolved polymers. These can be polymers or copolymers of the monomers above listed, as well as elastomers, synthetic or natural resins, etc., which are soluble in the monomeric composition.

It is also possible to use a pre-polymerizate which has been obtained by a partial polymerization and may have a syrupy consistency. The making of such pre-polymerizates is for instance described in the German published application 1,083,057 and in the French Pat. 1,221,537. Examples of such materials are polybutadiene and its copolymerizates with styrene and/or acrylonitrile, ketone-aldehyde condensation products, tall oil products, etc.

The amount of polymeric substance depends on the material to be treated. It can be varied in a broad range.

The liquid polymerizable organic compositions may in addition also contain conventional additives such as stabilizers, dyes, flame-proofing compounds, hydrophobing agents, UV-absorbents, etc.

The hardening of the liquid polymerizable organic compositions is effected in conventional manner by application of elevated temperatures, preferably in the presence of an initiator such as an organic peroxide or an azo-compound. Redox systems may also be used.

The amount of pressure and temperature depends on the type of monomer and polymers and on the thermal stability of the sheets treated. Generally, the temperature should be between 0 and 200° C. Preferred are temperatures between 100 and 150° C. which permit a suitable speed of operation without causing damage to the material.

The polymeric substance which is applied in the form of a polymerizate, of a copolymerizate or polymer mixture must be of such fine particle size that it permits pouring or strewing. This can for instance be easily accomplished by grinding of the polymerizate or preferably by employing a fine-sized pearl polymer. The particle size should in general not be in excess of 0.5 mm.

As polymers, apart from the preferred polymethacrylic acid methyl ester, it is possible to use also polymers of other monomers provided they are soluble or swellable in the liquid polymerizable composition. The polymerizates may also contain conventional additives such as UV-absorbents and pigments.

Regarding the pressure, it is preferred at first to apply only a small contact pressure and to employ higher pressures only after some solidification of the polymerizate coating.

The pressing may be effected as conventional with use of separator foils. The foils in this case may be provided with a specific surface formation in order to impart a desired appearance to the polymer coat.

In order to avoid a warping of the part after the curing, it is preferable to cool the part substantially while under pressure.

The following examples illustrate the invention.

Example 1

A cellular concrete block of a thickness of 7.5 cm. and a surface dimension of 36 x 31 cm. and a total weight of 6.2 kg. was coated with a polymerizable impregnating liquid until a uniformly wet surface was obtained. The liquid had the following composition:

86 wt.-parts of a pre-polymerizate comprising:
    70 wt.-parts methylmethacrylate (MMA)
    30 wt.-parts 2-ethylhexylmethacrylate
    0.3 wt.-parts octyl mercaptan and
    0.03 wt.-parts azoisobutyric acid dinitrile (AIBN)
14 wt.-parts of a mixture of 70 parts methylmethacrylate and 30 parts 2-ethylhexylmethacrylate
0.2 wt.-parts UV-absorbent
1.0 wt.-parts lauroyl peroxide paste (50% conc.) and
1.0 wt.-parts diacetylperoxide solution (25% conc.).

The viscosity of the liquid composition was 230 cp.

The pre-polymerizate was formed in a single vessel upon stirring. The AIBN was added to the total mass as a solution in monomeric MMA at a temperature within the vessel of 75° C. The reaction temperature within the mass was then maintained at about 100° C. After 36 minutes of total reaction time, cooling was effected and the mass was stabilized with 40 p.p.m. hydroquinone.

The thus treated surface was then coated by pouring on it a pourable polymer formed of 80 wt.-parts butylmethacrylate and 20 wt.-parts of methylmethacrylate. The grain size of the pearl polymer was below 0.5 mm. The applied amount was 55 g.

A decorative paper which had been steeped with the above impregnating resin was then placed on the block. The paper as such weighted 10 g. and absorbed 34 g. of the resin. On the still wet decorative paper a polymerizate as described above was then poured so as to obtain a thin even coating. The amount of polymerizate employed in this step was 41 g.

After this treatment the block was placed between silicon separator papers in a pressure apparatus heated to a temperature of 130° C. During the first 3 minutes, the press plates of the apparatus were brought together only to an extent that a light contact pressure was effected on the block. After 7 minutes, a pressure of 7 kg./cm.² was applied and maintained during 7 minutes. There followed cooling to about 50° C. whereupon the pressure was released.

Example 2

The same process was used as in Example 1, except that instead of the cellular concrete a block of pumice stone was employed. There was furthermore no decorative paper used in this case.

dimensions of the block: 24 x 9 x 15.5 cm.
weight of the block: 2800 g. corresponding to 835 g./1000 cm.³
coated surface: 24 x 15.5 cm.²
amount used:
　of impregnating resin: 80 g.
　of pourable pearl material: 70 g.
hardening in the press:
　5 min. at 130° C. with mere contact pressure
　10 min. at 130° C. at a pressure of 5 kg./cm.²
　cooling to +40° C. at a pressure of 5 kg./cm.²

The block thus obtained had an even surface coating of polymethacrylate with an excellent adhesion to the substrate. The coating filled even major depressions at the surface of the block and was highly resistant against the action of the weather and humidity.

To prevent that the impregnating liquid dragged into the larger cavities of the pumice block, 3% by weight of a thixotropy agent identified as "A28" were added. This agent is a product of the Degussa Company of Germany and consists of an asbestos fiber material of superfine dispersion.

Example 3

The same process was employed as in Example 1, except that instead of the cellular concrete a normal burned red brick clay was used having a lattice-like structure without any glaze.

dimensions of the block: 24 x 11 x 7 cm.
weight of the block: 2450 g. corresponding to 1325 g./1000 cm.³
coated surface: 24 x 7 cm.²
amount of impregnating liquid used:
　15 g. for impregnation of the block
　5 g. for impregnation of the decorative paper
amount of pourable polymerizate used:
　8 g. for the block
　4 g. for the wet surface of the decorative paper The hardening in the press was effected as described in Example 2. The thus-obtained structural part had an even, dense and highly decorative surface coating which was firmly bonded to the block. When it was attempted to separate the surface coating from the block, the block itself fractured.

Example 4

The same process was used as in Example 3, but instead of the brick clay a sand-lime brick was employed.

dimensions of the block: 24 x 11.5 x 11.5 cm.
weight of the block: 6365 g. corresponding to 2000 g./1000 cm.³
coated surface: 24 x 11.5 cm.²
amount of impregnating liquid used:
　25 g. for impregnating the block
　8 g. for impregnating the decorative paper
amount of pourable polymerizate used:
　10 g. for the block
　7 g. for the wet surface of the decorative paper The hardening was effected in the press as described in Example 2.

The structural part obtained had an even, highly decorative surface coating which was firmly bonded to the block. When the coating was attempted to be separated from the block, the block burst.

Example 5

The same process was used as in Example 3. However, instead of the brick clay a normal concrete block was used.

dimensions of the block: 26.5 x 21.5 x 8.5 cm.
weight of the block: 11,100 g. corresponding to a 2,300 g./1000 cm.³
coated surface: 26.5 x 21.5 cm.²
amount of impregnating liquid used:
　40 g. for the impregnation of the block
　17 g. for the impregnation of the decorative paper
amount of pourable polymerizate used:
　25 g. for the block
　12 g. for the wet surface of the decorative paper.

The hardening in the press was effected as described in Example 2. The structural part obtained had a uniform, highly decorative surface coating which was firmly bonded to the substrate. When trying to split the surface coating from the substrate, the block itself burst.

Example 6

The same process was used as in Example 1. However, instead of the decorative paper a wood veneer of mahogany was used of a thickness of 0.6 mm.

For the impregnation of the mahogany veneer 90 g. of impregnating liquid were employed.

The cellular concrete obtained in this case had a uniform coating of polymethacrylate in which the mahogany veneer was embedded as a decorative surface. The bond to the substrate was excellent. When trying to split the surface from the block, the block burst.

Example 7

The same process was used as in Example 1. However, the impregnating liquid had the following composition:

100 wt.-parts prepolymerizate of cyclohexylmethacrylate to which during its formation there were added in a manner similar to that employed in Example 1 0.3% octylmercaptan and 0.02% AIBN. The viscosity of the pre-polymerizate was 180 cp.

The structural part thus obtained likewise had a uniform coating of high quality.

Example 8

The same process was employed as in Example 1. However, the impregnating liquid had the following composition:

86 wt.-parts prepolymerizate consisting of:
　45 wt.-parts methylmethacrylate
　15 wt.-parts ethylhexylmethacrylate
　15 wt.-parts ethylhexylacrylate
　25 wt.-parts butylacrylate
　0.2 wt.-part glycoldimercaptoacetate
　0.02 wt.-part AIBN
　10 wt.-parts acetyltributylcitrate
　2 wt.-parts triethyleneglycoldimethacrylate
　1 wt.-parts acrylic acid
　1 wt.-parts lauroylperoxide paste (15% conc.)
　1 wt.-parts diacetylperoxide soltuion (25% conc.)

The structural part thus obtained had a uniform surface coating of high quality which had a particularly high resistance against temperature changes.

Example 9

The same process was used as in Example 1. However, the pourable polymerizate consisted of 92.5 wt.-percent methylmethacrylate and 7.5% of butylacrylate.

The structural part thus obtained had a uniform, firmly bonded coating which was highly resistant against chemical agents.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is set forth in the appended claims.

1. The process of making an absorptive structural part having improved surface properties, the said process comprising the steps of
   (a) moistening the said absorptive structural part with a liquid polymerizable organic composition;
   (b) then applying a finely divided thermoplastic polymeric substance in a substantially uniform manner across substantially all of at least one major face of the structural part, the said polymeric substance being soluble or swellable in said liquid polymerizable composition; and
   (c) thereupon subjecting the structural part to pressure and elevated temperatures sufficient to cause curing of said liquid polymerizable organic composition and to cause forming of a substantially coherent polymer coating on said part.

2. The process of claim 1, wherein a decorative cover layer for the structural part is applied to the surface of the latter.

3. The process of claim 1, wherein the moistening is effected by soaking the part in the liquid polymerizable composition.

4. The processs of claim 1, wherein the part is drained of excess liquid following the moistening with the liquid polymerizable composition and prior to application of the thermoplastic polymeric substance.

5. The processs of claim 1, wherein the part after application of the thermoplastic polymeric substance is stored for a limited period of time prior to application of said pressure and elevated temperature.

6. The process of claim 1, wherein the liquid polymerizable composition contains a polymeric substance dissolved therein.

7. The processs of claim 1, wherein the liquid polymerizable composition includes a plasticizer, polymerization accelerator, polymerization initiator or curing agent.

8. The process of claim 1, wherein the liquid polymerizable composition consists essentially of a methyl ester of methacrylic acid.

9. The process of claim 1, wherein the liquid polymerizable composition contains a polymethacrylic acid methyl ester dissolved therein.

10. The process of claim 1, wherein the liquid polymerizable composition consists of or contains a partially polymerized pre-polymerizate.

11. The process of claim 1, wherein the liquid polymerizable composition comprises monomeric methylmethacrylate and a pre-polymerizate of methylmethacrylate.

12. The process of claim 1, wherein the thermoplastic polymeric substance is a polymethacrylic acid methyl ester.

13. The process of claim 1, wherein the thermoplastic polymeric substance consists of pearl-shaped particles of a polymer of the methylester of methacrylic acid or a copolymer of different esters of methacrylic acid.

14. The process of claim 1, wherein the thermoplastic polymeric substance is a copolymer or a polymer mixture.

15. The process of claim 1, wherein the temperature applied to the part is between 100 and 150° C.

16. The process of claim 1, wherein the thermoplastic polymeric substance is in the form of a pourable or sprayable mass of finely divided particles.

17. The process of claim 16 wherein the polymeric substance has pearl-shaped particles of a size up to 0.5 mm.

18. The process of claim 1 wherein a decorative cover layer is separately moistened with said liquid polymerizable organic composition, then applied to the surface of the structural part after pretreating the latter as defined in (a) and (b) of said claim 1 whereupon the finely divided thermoplastic substance is applied to the decorative cover layer in the manner as in (b) of said claim 1, followed by subjecting the composite product to pressure and elevated temperature as provided in (c) of said claim 1.

19. The process of claim 18, wherein the decorative cover layer consists of a decorative paper layer.

20. The process of making an absorptive structural part having improved surface properties and essentially consisting of a material selected from the group consisting of concrete, lightweight concrete, cellular concrete, brick clay, sandlime brick and pumice stone, the said process comprising the steps of
   (a) moistening the said structural part with a liquid polymerizable organic composition;
   (b) then applying a finely divided thermoplastic polymeric substance in a substantially uniform manner across substantially all of at least one major face of the structural part, the said polymeric substance being soluble or swellable in said liquid polymerizable composition; and
   (c) thereupon subjecting the structural part to pressure and elevated temperatures sufficient to cause curing of said liquid polymerizable organic composition and to cause forming of a substantially coherent polymer coating on said part.

21. The process of claim 20, wherein the structural part is a block of concrete, cellular concrete or light weight concrete.

22. The process of claim 20, wherein the said structural part is a block of brick clay sandlime brick or pumice stone.

23. The process of claim 20 wherein the decorative cover consists of a layer of veneer wood.

References Cited

UNITED STATES PATENTS

| 2,631,960 | 3/1953 | Dafter | 156—278 |
| 3,560,253 | 2/1971 | Ashton | 117—123 D |
| 3,567,496 | 3/1971 | Steinberg et al. | 117—123 D |

ALFRED L. LEAVITT, Primary Examiner

C. WESTON, Assistant Examiner

U.S. Cl. X.R.

117—54, 123 C, 123 D; 156—278, 279, 332